F. A. SANDSTROM.
ELECTRIC SOLDERING IRON.
APPLICATION FILED SEPT. 5, 1911.
1,045,615.
Patented Nov. 26, 1912.
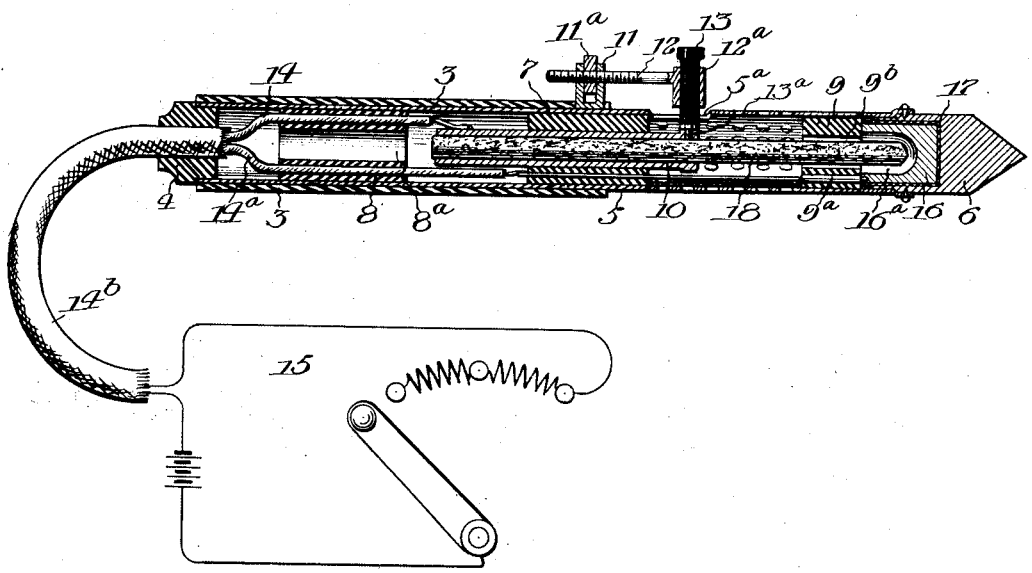
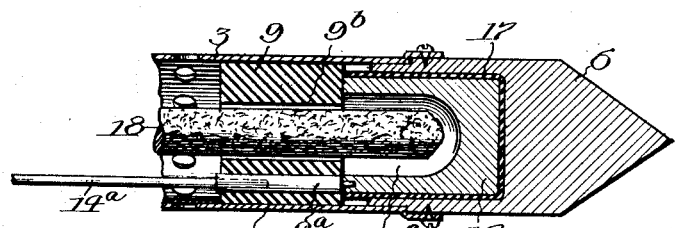
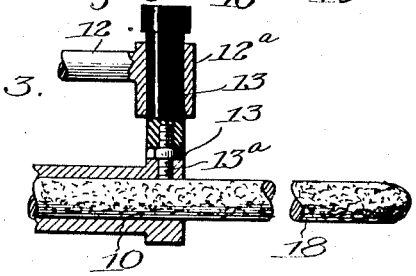

UNITED STATES PATENT OFFICE.

FRANK A. SANDSTROM, OF CHICAGO, ILLINOIS, ASSIGNOR OF ONE-HALF TO FREDERICK BENJAMIN, OF CHICAGO, ILLINOIS.

ELECTRIC SOLDERING-IRON.

1,045,615.   Specification of Letters Patent.   Patented Nov. 26, 1912.

Application filed September 5, 1911. Serial No. 647,565.

*To all whom it may concern:*

Be it known that I, FRANK A. SANDSTROM, citizen of the United States, residing at Chicago, in the county of Cook and State of Illinois, have invented certain new and useful Improvements in Electric Soldering-Irons, of which the following is a specification.

This invention relates to improvements in electric soldering irons of the class in which an arc is formed for the purpose of heating the copper point or head which forms the solder applying member of such devices.

The principal objects of the improvements embodied in this invention are to provide a tool of the character stated which can be economically manufactured inasmuch as the number of parts are of simple form and are reduced to a minimum, and one which will not be liable to get out of order from the use to which such tools are commonly subjected.

A further object is to provide an electric soldering tool in which a common carbon pencil can be used, easily and quickly adjusted and which will form one of the arc terminals, the copper tip forming the other terminal.

A further object is to provide means whereby the arc will be formed not only at the end of the carbon but along the sides thereof, thus prolonging the utility of the carbon and securing a high degree of heat.

A further object is to provide means for adjusting the carbon as it becomes burned, which adjusting means will be free from springs or all delicate parts liable to get out of order in the common use of the tool.

Having the foregoing and other objects of general utility in view, I have produced the improved soldering iron illustrated in a preferred form in the accompanying drawing, in which:—

Figure 1 is a longitudinal section of a soldering iron constructed according to my invention, with a rheostat shown diagrammatically; Fig. 2 is an enlarged sectional detail of the arc end of the tool, and Fig. 3 is an enlarged sectional detail of the carbon gripping member.

Referring to the details of the drawing, 3 represents a handle which may be made of or covered by any suitable insulating material, the same being in the form of a section of tubing of sufficient length to be readily grasped by the hand of the person using the tool. The rear end of the handle is closed by a plug 4 of suitable insulating material which also serves as a closure for the corresponding end of a metal tube 5 which constitutes the main body of the tool and incloses or forms a support for all the other members. To the opposite end of the body 5 is secured a copper point 6, which is of the usual exterior shape, but is cylindrically hollowed or chambered on the inside.

Fitted within the tube 5 are three cylindrical bushings, 7, 8 and 9, respectively, made of non-conducting material. The bushing 7 is placed about midway the length of the body and in its bore is slidably fitted a metal sleeve 10. Secured to the tube 5 at the inner end of the handle 3, is a post 11 which is transversely bored without threads to receive a screw 12, and is slotted to receive the nut $11^a$ having a threaded engagement with said screw 12. On one end of the screw 12 is an angular extension $12^a$ which is bored vertically to receive the pin 13 of insulating material the inner end of which passes through a slot $5^a$ in the body 5, and receives a screw $13^a$ which engages a threaded hole in the sleeve 10 and impinges on the carbon 18. The sleeve 10 receives and holds with slight frictional engagement, the carbon pencil 18 so that the longitudinal adjustment of said sleeve will cause a corresponding movement of the carbon 18, when the end of the screw $13^a$ engages the carbon, but when the screw $13^a$ is turned so as to release the carbon the latter may be slid through the sleeve by tilting the tool to a vertical position.

The bushing 8 has a bore $8^a$ of somewhat larger diameter than the carbon pencil so that the latter may slide freely therethrough, and is also bored with two longitudinal openings on opposite sides of the bore to receive the insulated wires 14, $14^a$, which, it will be understood, are suitably connected with the rheostat 15 and represent the positive and negative sides of the electric current. These wires are further insulated by the usual tubing $14^b$ exteriorly of the tool, and may be of any length desired for the convenient electrical connection and practical operation of the device.

The inner ends of the conducting wires 14, $14^a$, are connected within the body 5 of the tool as follows:—The wire 14 has its inner end connected with the sleeve 10, and the wire 14ª passes through a suitable longitudinal opening in the bushing 7, and also through a small tube 9ª which passes through the bushing 9, and the extreme end of the wire 14ª is in contact with a copper block 16 which fits within the hollow or recessed portion of the copper 6, and is electrically insulated from the latter by a tubular shell 17 of mica or other suitable insulating material. The copper block 16 is formed with a recess 16ª the bottom of which is rounded as shown and the cross diameter of said recess is of the proper diameter to effect an arc when the carbon pencil is in the position shown in Figs. 1 and 2, and such arc will be formed at all points equally distant from the side walls of the copper block 16. The tube or body 5 adjacent to the arc end of the tool is provided with a plurality of perforations to permit the escape of the heat which also permit the spark resulting from the arc, to be seen by the operator. It will be understood that as the nut 11ª is turned the screw 12 is moved longitudinally of the body and thereby carries the sleeve and carbon in the same direction.

When the carbon pencil is burned to the extent permitted by the holding and adjusting portions of the tool, it may be removed by disconnecting the plug 4 and jarring the tool until the carbon falls out. It will also be understood that the copper 6 may be readily disconnected from the tube or body 5 by removing the screws which pass through the countersunk end of the body and impinge on the copper.

Having thus described my invention, what I claim as new, is:—

1. In a heat producing device, a holder, a metal terminal secured in said holder and having a chamber therein, a head arranged on said terminal and electrically insulated therefrom, a carbon stick adjustably mounted in said holder and having one end projecting into the chamber of said metal terminal, the relative diameters of said carbon and chamber being such that a spark-gap is maintained between the end and side of said carbon and the walls of said chamber, and means for producing an arc between said carbon and the walls of said chamber.

2. In a heat producing device, a holder, a metal terminal secured in one end of said holder and having a chamber therein, a head arranged on said terminal and electrically insulated therefrom, a carbon-stick mounted in said holder and having one end projecting into said chamber, the relative diameters of said carbon and chamber being such that a spark-gap is maintained between the side of the carbon and the side walls of the chamber, and means for adjusting said carbon, said means comprising a sleeve supporting said carbon, a pin engaging the carbon, a screw connected with said pin, and means for adjusting said screw to move said pin longitudinally of the holder, in combination with means for producing an arc between said carbon and the walls of said terminal chamber.

3. In a heat producing device, a holder consisting of a tube, a metal terminal secured in one end of said tube and insulated therefrom and having an elongated chamber therein, a head secured to said holder and electrically insulated from said terminal, a metal sleeve arranged centrally of said holder and insulated therefrom, a carbon arranged in and supported by said sleeve and having one end projecting into the chamber of said metal terminal, the relative diameters of said carbon and terminal chamber being such that a spark gap is maintained so long as there is any of the carbon within said chamber, and means for producing an arc between said carbon and the walls of said terminal.

In testimony whereof I affix my signature in the presence of two witnesses.

FRANK A. SANDSTROM.

Witnesses:
 M. A. MILORD,
 F. BENJAMIN.